(12) United States Patent
Takahashi et al.

(10) Patent No.: US 7,903,378 B2
(45) Date of Patent: Mar. 8, 2011

(54) MAGNETIC HEAD STRUCTURE AND METHOD FOR MANUFACTURING MAGNETIC HEAD STRUCTURE

(75) Inventors: Toru Takahashi, Niigata-ken (JP); Kiyoshi Kobayashi, Niigata-ken (JP); Eiji Ozaki, Niigata-ken (JP)

(73) Assignee: TDK Corporation, Tokyo (JP)

( * ) Notice: Subject to any disclaimer, the term of this patent is extended or adjusted under 35 U.S.C. 154(b) by 787 days.

(21) Appl. No.: 11/856,891

(22) Filed: Sep. 18, 2007

(65) Prior Publication Data

US 2008/0074801 A1   Mar. 27, 2008

(30) Foreign Application Priority Data

Sep. 22, 2006 (JP) .................. 2006-256950

(51) Int. Cl.
*G11B 5/31* (2006.01)
(52) U.S. Cl. ........................................ 360/313
(58) Field of Classification Search .............. 360/313; 29/603.07
See application file for complete search history.

(56) References Cited

U.S. PATENT DOCUMENTS

| | | | |
|---|---|---|---|
| 4,675,986 A * | 6/1987 | Yen .............................. | 29/603.1 |
| 6,859,678 B1 * | 2/2005 | Barada et al. ................. | 700/121 |
| 7,359,152 B2 * | 4/2008 | Matono et al. ........... | 360/125.33 |

FOREIGN PATENT DOCUMENTS

| | | |
|---|---|---|
| JP | 1-184613 | 7/1989 |
| JP | 2005-339781 | 12/2005 |
| JP | 2006-048806 | 2/2006 |
| JP | 2006-073088 | 3/2006 |

OTHER PUBLICATIONS

Office Action issued in corresponding Japanese Patent Application No. 2006-256950; issued Jun. 17, 2008.

* cited by examiner

*Primary Examiner* — Mark Blouin
(74) *Attorney, Agent, or Firm* — Brinks Hofer Gilson & Lione

(57) ABSTRACT

A magnetic head substrate is provided with a recording element having a main magnetic pole layer and a recording-side monitor element including a resistance film, a lead conductor located as a layer below the resistance film, and a contact conductor for conductively connecting the resistance film and the lead conductor. The resistance film is formed on the same plane as that for a lowermost layer of the main magnetic pole layer or a base layer from the same material as that for them, so as to straddle the surface position of a medium-facing surface in the height direction. The contact conductor and the lead conductor are disposed while being retreated to the back side of the above-described position in the height direction. The upper surface and the lower surface of the contact conductor are entirely in contact with the resistance film and are not exposed to the outside.

5 Claims, 7 Drawing Sheets

MAGNETIC HEAD STRUCTURE AND METHOD FOR MANUFACTURING MAGNETIC HEAD STRUCTURE

CLAIM OF PRIORITY

This application claims benefit of the Japanese Patent Application No. 2006-256950 filed on Sep. 22, 2006, which is hereby incorporated by reference.

BACKGROUND

1. Field of the Invention

The present invention relates to a magnetic head structure including a monitor element to be used in polishing for forming a medium-facing surface of a head element portion and a method for manufacturing the magnetic head structure.

2. Description of the Related Art

In general, when a magnetic head is produced, head element portions (head element structures) prepared by laminating at least a playback element and a recording element are formed and arrayed into a plurality of rows on a wafer (substrate). Thereafter, the wafer is cut into each row, and a medium-facing surface is formed (an element height is regulated) by polishing, so that a bar-shaped magnetic head substrate in which a plurality of head element portions are disposed in a single line on a wafer or individual (chip-shaped) magnetic heads, in which one head element portion is formed on a wafer, are produced. In the present specification, the bar-shaped magnetic head substrate and the chip-shaped magnetic head are collectively referred to as a magnetic head structure.

Heretofore, in polishing for forming the above-described medium-facing surface, a wafer end surface is polished in a element height direction while the element resistance is detected by passing a current through a playback element or a playback-side monitor element formed simultaneously with the playback element, and the polishing is terminated when the element resistance reaches a predetermined value. However, when the element height is regulated on the basis of the resistance value of the playback element or the playback-side monitor element, it is difficult to grasp an actual element height dimension of a recording element. Since the element height dimension of the recording element is an important factor that contributes to recording characteristics, the element height dimension must be regulated precisely. Consequently, in recent years, it has been proposed that a playback-side monitor element having a resistance value which is changed in accordance with the element height dimension of the playback element is formed simultaneously with the playback element and, in addition, a recording-side monitor element having a resistance value which is changed in accordance with the element height dimension of the recording element is formed simultaneously with the recording element. Each of the playback element and the recording element is polished to a position suitable for obtaining desired characteristics while a current is passed through the playback-side monitor element and the recording-side monitor element so as to detect their respective element resistances.

As shown in, for example, FIG. 7, the recording-side monitor element can be composed of a resistance film 131 formed simultaneously with the recording element, a lead conductor 132 located as a layer below the resistance film 131, and a contact conductor 133 for conductively connecting the resistance film 131 and the lead conductor 132. The peripheries of the resistance film 131, the lead conductor 132, and the contact conductor 133 are covered with insulating material films 140, 141, and 142 formed from, for example, $Al_2O_3$.

Thin film magnetic heads including a monitor element to be used for controlling polishing are described in, for example, Japanese Unexamined Patent Application Publication No. 2005-339781, Japanese Unexamined Patent Application Publication No. 2006-48806, and Japanese Unexamined Patent Application Publication No. 2006-73088.

In recent years, in order to achieve higher recording density, many recording elements of perpendicular recording system have been used, which includes a main magnetic pole layer for applying a perpendicular recording magnetic field to a recording medium, an auxiliary magnetic pole layer for receiving a recording magnetic field returned after passing the recording medium, a recording coil for applying a recording magnetic field to the main magnetic pole layer, and the like. The element height dimension in this perpendicular recording element is a height direction dimension of a pole straight portion of the main magnetic pole layer, a so-called neck height. In order to regulate the neck height with high precision, it is preferable that a resistance film of the recording-side monitor element is formed simultaneously on the same plane as that for the main magnetic pole layer, from the same material as the material for the main magnetic pole layer. However, since the main magnetic pole layer is formed having a large thickness in general, when the recording-side monitor element formed simultaneously with the main magnetic pole layer is used, the monitor resistance before polishing is small, and the amount of change in resistance due to polishing is decreased. Therefore, there is a problem in that a polishing termination position is hard to be detected.

For a means for solving this, recently, it is known that a resistance film of a recording-side monitor element is formed by using a main magnetic pole plated base layer disposed directly below the main magnetic pole layer, as described in Japanese Unexamined Patent Application Publication No. 2006-73088, for example.

The recording-side monitor element by using the main magnetic pole plated base layer can be disposed by forming a resistance film on a contact conductor simultaneously with the main magnetic pole layer plated base layer, forming a mask covering a monitor region to be formed on this resistance film, removing the resistance film exposed at the mask by milling, and furthermore, removing the mask by wet etching. Since the main magnetic pole layer plated base layer has a very small thickness as compared with the thickness of the main magnetic pole layer, satisfactory monitor sensitivity can be obtained.

Figure 7:
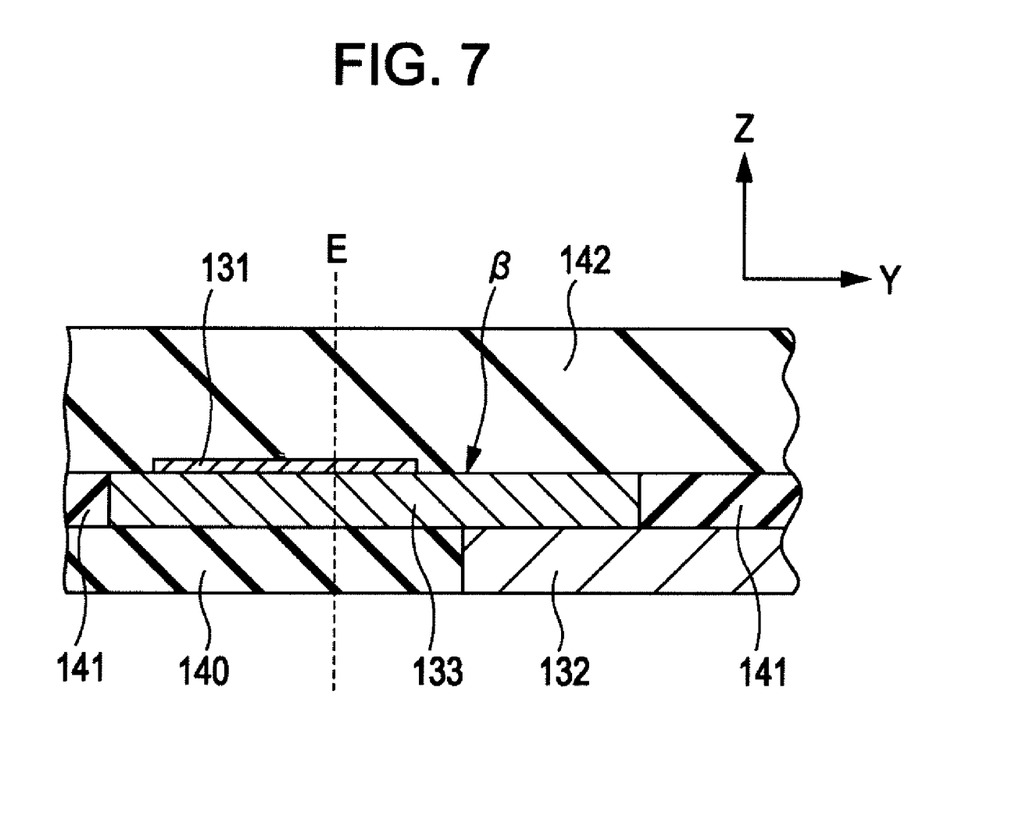
FIG. 7 is a sectional view showing a recording-side monitor element having a known structure.

However, as shown in FIG. 7, a known recording-side monitor element has a structure in which the contact conductor 133 is extended outward as compared with the resistance film 131. Therefore, when the above-described mask is removed by wet etching, the extended portion β of the contact conductor 133 is also etched simultaneously. Consequently, not only the element resistance of the resulting recording-side monitor element (contact conductor) is changed, but also the contact conductor and the lead conductor are broken by etching so as to bring the resistance film out of conduction at worst, and the function as the recording-side monitor element is not exerted.

In the configuration of the known recording-side monitor element, the resistance film and the contact conductor is cut together by polishing. Therefore, a change in resistance of the resistance film and a change in resistance of the contact conductor appear as changes in element resistance of the recording-side monitor element. In order to regulate the neck height of the main magnetic pole layer, it is preferable that the polishing termination timing is controlled merely by the change in resistance of the resistance film formed simultaneously with the main magnetic pole plated base layer.

SUMMARY

In consideration of the above-described problems, the present invention provides a magnetic head structure in which a resistance film of a recording-side monitor element can be formed without damaging a contact conductor and a lead conductor and the element height of a recording element can be regulated with high precision, as well as a method for manufacturing the magnetic head structure.

The present invention has been completed taking notice that when the entire contact conductor is covered with a resistance film, an etching damage can be avoided and a change in resistance and a break of the contact conductor can be prevented; when the resistance film is formed astride a surface position of a medium-facing surface in the height direction, the contact conductor entirely covered with this resistance film can be formed; and when the contact conductor and the lead conductor are retreated to the back side of the surface position of the medium-facing surface in the height direction, merely the resistance film is cut in polishing and the polishing termination timing can be controlled by the change in resistance of the resistance film.

That is, a magnetic head structure according to an aspect of the present invention is provided with a recording element having a main magnetic pole layer and a recording-side monitor element to be used as an element resistance monitor in polishing for forming a medium-facing surface of the recording element. The recording-side monitor element includes a resistance film, a lead conductor located as a layer below the resistance film, and a contact conductor for conductively connecting the resistance film and the lead conductor. The resistance film is composed of the same material as that for a lowermost layer of the main magnetic pole layer or a base layer and is disposed on the same plane as that for the lowermost layer or the base layer, in such a way as to straddle the surface position of the medium-facing surface to be regulated by the polishing in the height direction. The contact conductor and the lead conductor are disposed while being retreated to the back side of the surface position of the medium-facing surface to be regulated by the polishing in the height direction.

Preferably, the entire contact conductor is disposed on a medium-facing surface-side end portion of the lead conductor. When the entire surface of the contact conductor is in contact with the lead conductor, the resistance film and the lead conductor can be conductively connected more reliably.

A method is provided for manufacturing a magnetic head structure provided with a recording element having a main magnetic pole layer and a recording-side monitor element to be used as an element resistance monitor in polishing for forming a medium-facing surface of the recording element. The recording-side monitor element includes a resistance film, a lead conductor located as a layer below the resistance film, and a contact conductor for conductively connecting the resistance film and the lead conductor. According to an aspect of the present invention, a lead conductor is formed as a layer below the plane on which a lowermost layer of the main magnetic pole layer or a base layer is formed, while the lead conductor is retreated to the back side of the surface position of a medium-facing surface to be regulated by the polishing in the height direction; forming a contact conductor on a medium-facing surface-side end portion of the lead conductor in such a way that the lead conductor has an area to be entirely covered with a resistance film to be formed in a downstream operation and a thickness adequate for reaching the plane on which the lowermost layer of the main magnetic pole layer or the base layer is formed; forming a resistance film on the plane including the contact conductor from the same material as that for the lowermost layer of the main magnetic pole layer or the base layer simultaneously with the formation of the lowermost layer of the main magnetic pole layer or the base layer. A mask covering the resistance film is formed in such a way as to straddle the surface position of the medium-facing surface in the height direction simultaneously with the formation of the main magnetic pole layer. The resistance film exposed at the mask is removed and, thereafter, the mask is removed.

According to the magnetic head structure of the present invention, since merely the resistance film is cut and the contact conductor and the lead conductor are not cut in the polishing of the recording monitor element, the electrical resistance of the resistance film can be detected as the element resistance of the recording-side monitor element, and the element height dimension of the recording element can be regulated with high precision.

Furthermore, according to the method for manufacturing a magnetic head structure of the present invention, since the contact conductor is not damaged by the etching, a change in resistance and a break of the contact conductor due to etching do not occur, and the resistance film and the lead conductor are conductively connected reliably through this contact conductor. In this manner, a recording-side monitor element exhibiting satisfactory monitor sensitivity can be formed, and a magnetic head structure, in which the element height dimension of a recording element can be regulated with high precision, is obtained.

DESCRIPTION OF THE EMBODIMENTS

The present invention will be described below with reference to the drawings. In the drawing, the X direction is defined as a track width direction, the Y direction is defined as a height direction, and the Z direction is defined as a lamination direction of individual layers constituting the magnetic head and a movement direction of a recording medium.

Figure 1:
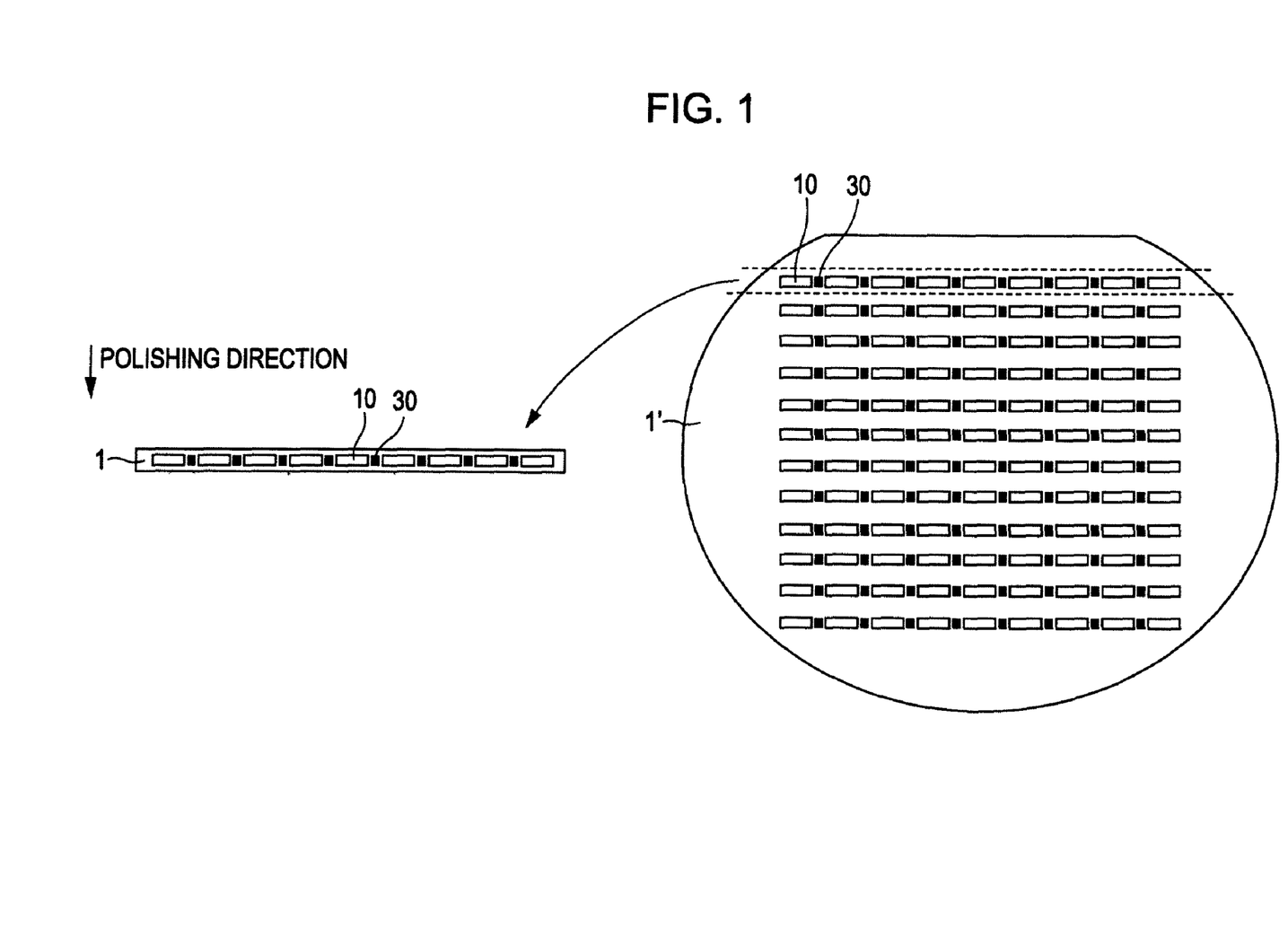
FIG. 1 is a schematic plan view showing a thin film magnetic head substrate, to which the present invention has been applied.

FIG. 1 is a schematic plan view showing a perpendicular magnetic head structure, to which the present invention has been applied. As shown in FIG. 1, a magnetic head structure 1 described below is in a state in which many head element portions 10 and monitor element portions 30 formed and arrayed into rows on one wafer 1' are cut into the shape of a slender bar (a state before polishing for forming a medium-facing surface is performed). In FIG. 1, the head element portion 10 is indicated by an empty rectangle, and the monitor element portion 30 is indicated by a filled rectangle.

Figure 2:
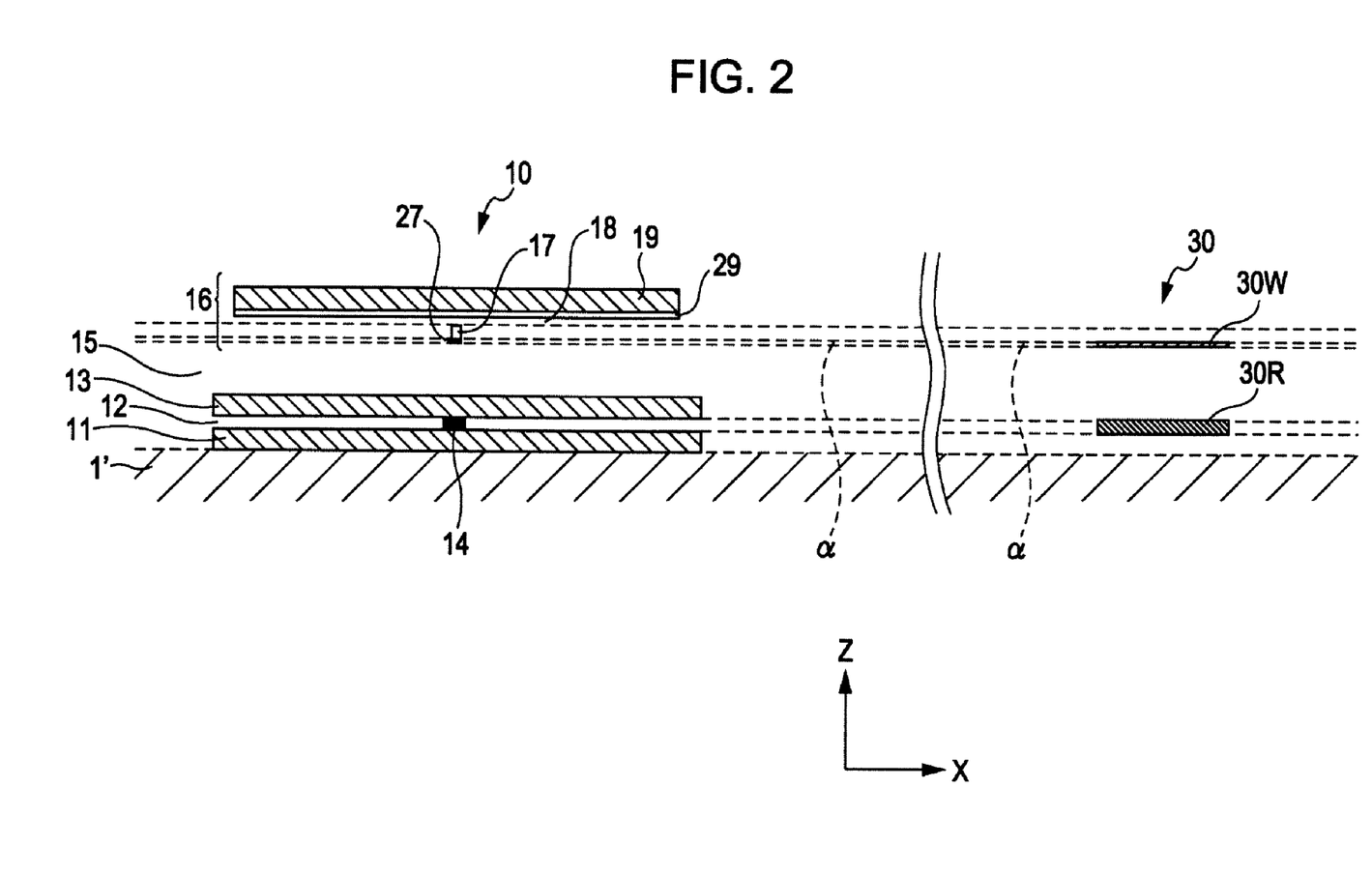
FIG. 2 is a sectional view showing a laminated structure of a head element portion (perpendicular magnetic recording system) and a monitor element portion shown in FIG. 1, viewed from the side of an end surface serving as a medium-facing surface.

FIG. 2 is a sectional view showing a laminated structure of a head element portion 10 and a monitor element portion 30, viewed from the side of an end surface serving as a medium-facing surface. The head element portion 10 includes a playback element 14 for reading magnetic recording information of a recording medium by using a magnetoresistance effect and a recording element 16 for applying a recording magnetic field to the recording medium to perform a recording operation. The playback element 14 is a magnetoresistive sensor, e.g., an AMR, a GMR, or a TMR, and is disposed in a gap insulating layer 12 filling between a lower shield layer 11 and an upper shield layer 13.

The recording element 16 is a recording element of perpendicular magnetic recording system, and is laminated on the upper shield layer 13 with an insulating layer 15 therebetween. This recording element 16 includes a main magnetic pole layer 17 for applying a perpendicular recording magnetic field to a recording medium, an auxiliary magnetic pole layer (return path layer) 19 for receiving a recording magnetic field returned after passing the recording medium, a magnetic gap layer 18 interposing between the main magnetic pole layer 17 and a medium-facing surface-side end portion of the auxiliary magnetic pole layer 19, an auxiliary yoke layer (not shown in the drawing) disposed directly under and in contact with the main magnetic pole layer 17 so as to magnetically function integrally with the main magnetic pole layer 17, and a recording coil (not shown in the drawing) disposed between the main magnetic pole layer 17 and the auxiliary magnetic pole layer 19 so as to apply a recording magnetic field to the main magnetic pole layer 17.

Figure 3:
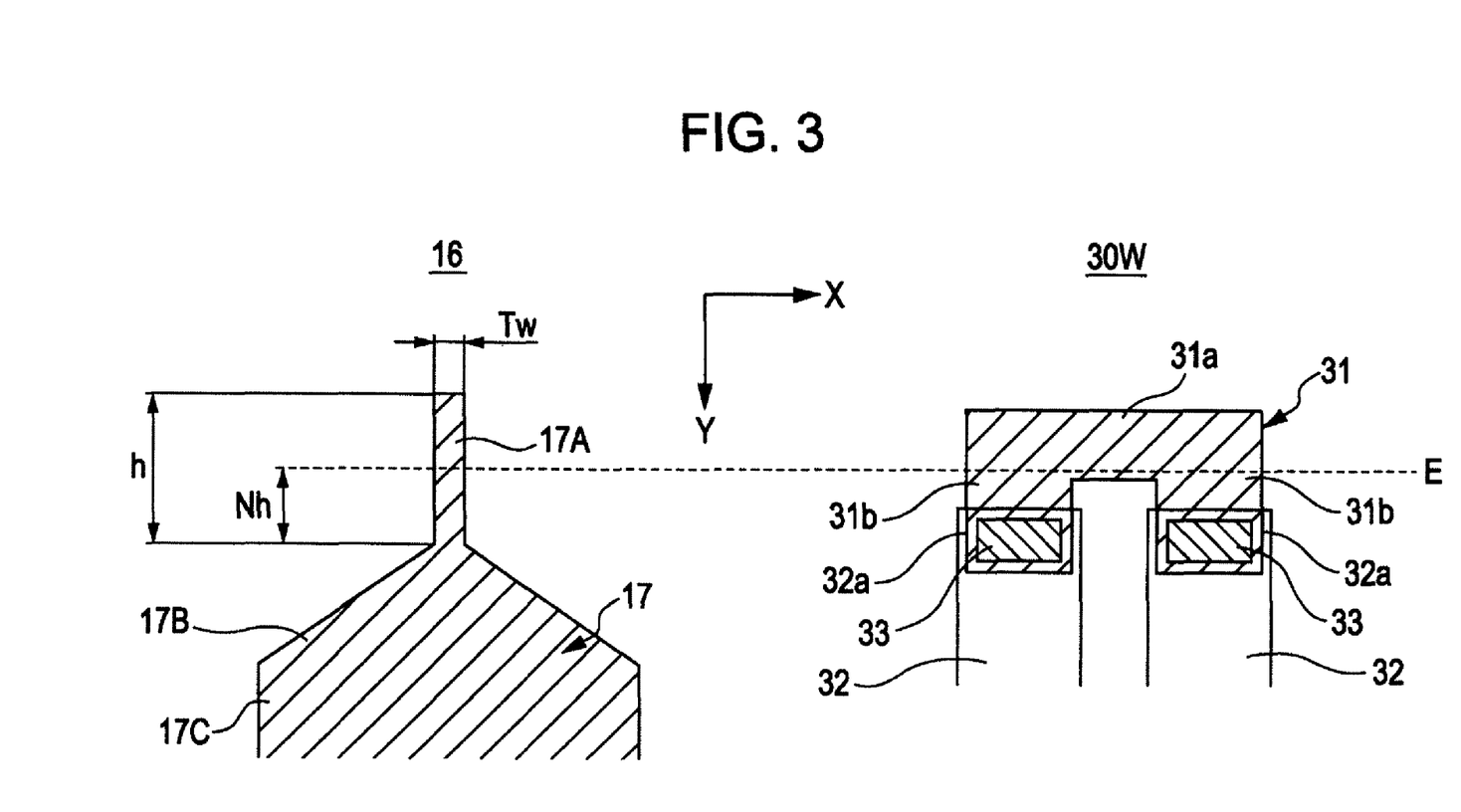
FIG. 3 is a plan view showing a two-dimensional shape of a main magnetic pole layer and a recording-side monitor element.

As shown in the two-dimensional shape in FIG. 3, the main magnetic pole layer 17 includes a pole straight portion 17A, a flare portion 17B, and a base portion 17C sequentially from the side serving as the medium-facing surface. The pole straight portion 17A constitutes a front end surface of the main magnetic pole layer 17 exposed at the medium-facing surface, the dimension in the track width direction is a predetermined write track width of Tw, and the dimension in the height direction is a dimension of h larger than a predetermined neck height of Nh (h>Nh). The dimension in the height direction of this pole straight portion 17A is the element height of the recording element 16, and is regulated at a predetermined neck height of Nh by polishing described later. The main magnetic pole layer 17 shown in FIG. 3 is in the state before polishing. The flare portion 17B is a region for narrowing a recording magnetic field from the base portion 17C toward the pole straight portion 17A, and the dimension in the track width direction is increased from the pole straight portion 17A toward the back side in the height direction.

One end portion on the medium-facing surface-side of the auxiliary magnetic pole layer 19 is opposed to the main magnetic pole layer 17 with the magnetic gap layer 18 therebetween, the other end portion on the back side in the height direction as compared with the surface position of the medium-facing surface is magnetically connected to the main magnetic pole layer 17 and, therefore, the auxiliary magnetic pole layer 19 constitutes a closed magnetic circuit together with the main magnetic pole layer 17. The main magnetic pole layer 17 and the auxiliary magnetic pole layer 19 are formed on a main magnetic pole base layer 27 and an auxiliary magnetic pole base layer 29, respectively, from a ferromagnetic material, e.g., Ni—Fe, Co—Fe, or Ni—Fe—Co, having a high saturation magnetic flux density by plating, for example. The main magnetic pole base layer 27 and the auxiliary magnetic pole base layer 29 can be formed to have a single-layer structure of any one of Ta, Cr, NiCr, Ti, CrTi, W, V, Ru, Rh, TiW, Au, Nb, CrMo, and NiFe or a multilayer structure in which at least two types thereof are laminated. The main magnetic pole base layer 27 and the auxiliary magnetic pole base layer 29 may be formed from the same material or different types of material. The main magnetic pole layer 17 and the auxiliary magnetic pole layer 19 can also be formed by sputtering film formation.

The auxiliary yoke layer is disposed while being retreated to the back side of the surface position of the medium-facing surface in the height direction, and is not shown in FIG. 2. Likewise, the recording coil is formed between the main magnetic pole layer 17 and the auxiliary magnetic pole layer 19 while being retreated to the back side of the surface position of the medium-facing surface in the height direction, and is not shown in FIG. 2. For this recording coil, a coil having a solenoidal shape, in which a lower coil and an upper coil located above and below the main magnetic pole layer 17 are electrically connected to each other at an end portion in the track width direction, or a spiral shape, in which the coil is wound around the other end portions (connection portions) of the main magnetic pole layer 17 and the auxiliary magnetic pole layer 19, can be used.

The monitor element portion 30 is an element resistance monitor to be used in polishing for forming the medium-facing surface of the head element portion 10. In the present embodiment, as shown in FIG. 1, each of the monitor element portions 30 is formed between individual head element portions 10. However, the monitor element portion 30 may be formed while being incorporated into the head element portion 10. The monitor element 30 is composed of a playback-side monitor element 30R and a recording-side monitor element 30W. In polishing of the medium-facing surface, the dimensions of the playback element 14 and the recording element 16 in the element height direction can be detected independently on a basis of changes in resistance of the playback-side monitor element 30R and the recording-side monitor element 30W.

The playback-side monitor element 30R is formed simultaneously with the playback element 14, that is, at the same layer level as the playback element 14, but at a position different from the position of the playback element 14. For example, in the case where the playback element 14 is a CIP type magnetoresistive sensor, this playback-side monitor element 30R can be formed as a CIP type magnetoresistive sensor having the same film configuration as that of the playback element 14. In the case where the playback element 14 is a CPP type magnetoresistive sensor, the playback-side monitor element 30R can be formed as a CIP type magnetoresistive sensor including a multilayer film having an element resistance larger than that of the playback element 14 and the same film configuration as that of the playback element 14 and a pair of electrode layers for applying a sense current parallel to the film surfaces of the multilayer film. Alternatively, the playback-side monitor element 30R may be formed from a material not exhibiting a magnetoresistance effect but exhibiting a predetermined electric resistance and, specifically, be formed to have a single-layer structure of any one of Ta, Cr, NiCr, Ti, CrTi, W, V, Ru, Rh, TiW, Au, Nb, CrMo, and NiFe or a multilayer structure in which at least two types thereof are laminated.

Figure 6:
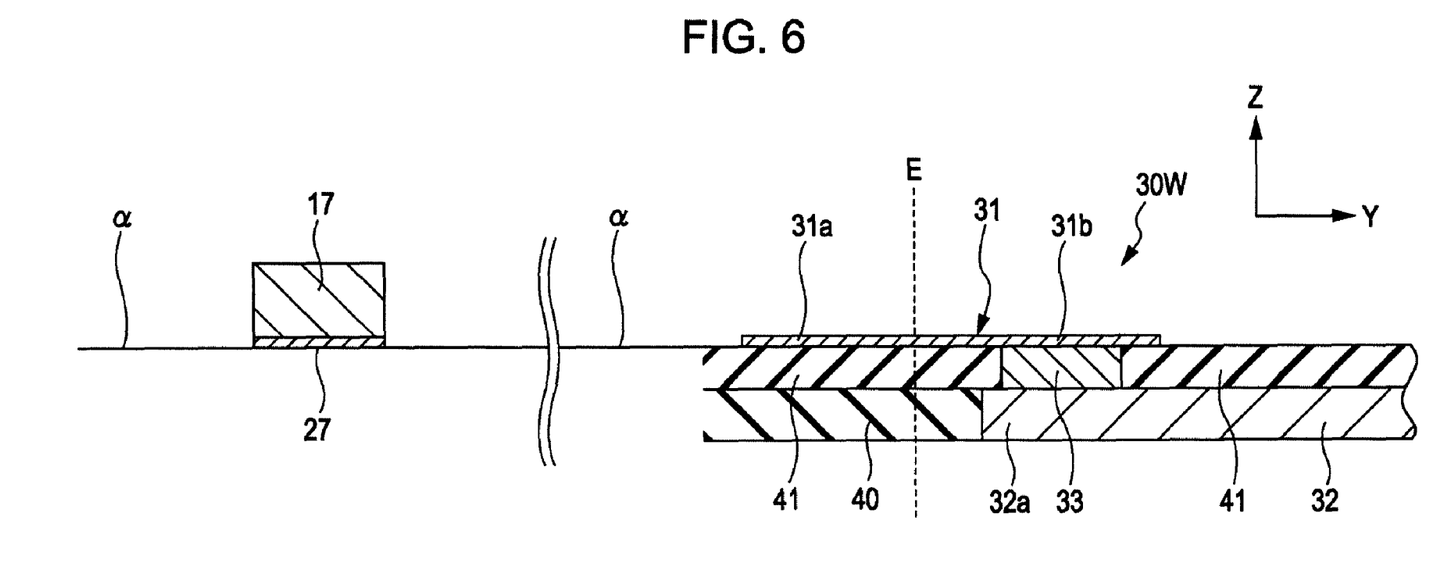
FIG. 6 is a sectional view showing a step following the step as shown in FIG. 5.

FIG. 3 and FIG. 6 are a plan view and a sectional view, respectively, showing the structure of the recording-side monitor element 30W. The chain line E as shown in FIG. 3 and FIG. 6 indicates the surface position of the medium-facing surface to be regulated by polishing, that is, a polishing termination line.

The recording-side monitor element 30W is provided with a resistance film 31, a lead conductor 32 located as a layer below the resistance film 31, and a contact conductor 33 for conductively connecting the resistance film 31 and the lead conductor 32.

The resistance film 31 is formed simultaneously with the main magnetic pole base layer 27 of the recording element 16, that is, on the same plane as that for the main magnetic pole base layer 27, but at a different position, from the same material as the material for the main magnetic pole base layer 27. As shown in FIG. 3, the resistance film 31 has a two-dimensional shape of the letter U including a transverse linear portion 31a having a predetermined height direction dimension and extending in the track width direction and a pair of longitudinal linear portions 31b extending from the both ends of the transverse linear portion 31a in the track width direction to a lead conductor 32 on the back side in the height direction, and is present astride the polishing termination line E in the height direction.

The lead conductors 32 are disposed while being retreated to the back side in the height direction as compared with the polishing termination line E. Put another way, medium-facing surface-side end portions 32a of the lead conductors 32 are located on the back side in the height direction as compared with the polishing termination line E. The lead conductor 32 of the present embodiment has a linear shape extending along the height direction, and a pair of lead conductors 32 is provided in accordance with a pair of longitudinal linear portions 31b of the resistance film 31. The dimension of the lead conductor 32 in the track width direction is specified to be larger than the dimensions of the resistance film 31 and the contact conductor 33 in the track width direction.

The contact conductors 33 are disposed while being retreated to the back side in the height direction as compared with the polishing termination line E, similarly to the lead conductors 32. Specifically, the contact conductor 33 is formed on each of the medium-facing surface-side end portions 32a of the pair of lead conductors 32 so as to connect the pair of lead conductors 32, which are in accordance with the pair of longitudinal linear portions 31b of the resistance film 31, in the vertical direction in FIG. 6. The contact conductor 33 is two-dimensionally smaller than each of the longitudinal linear portions 31b of the resistance film 31 and the lead conductor 32 (the dimension in the track width direction and the dimension in the height direction are smaller than the dimensions in the track width direction and the dimensions in the height direction of each of the longitudinal linear portions 31b of the resistance film 31 and the lead conductor 32), and all the upper surface and the lower surface are covered with the longitudinal linear portions 31b and the lead conductor 32, so that the contact conductor 33 is not extended to the outside. Put another way, all the conductor upper surfaces of the contact conductors 33 are in contact with the longitudinal linear portions 31b of the resistance film 31, and all the conductor lower surfaces of the contact conductors 33 are in contact with the lead conductors 32.

The lead conductor 32 and the contact conductor 33 are formed from an electrically conductive material, e.g., Cu, Ni, or NiFe, or a laminate thereof. When the same material as that for the recording coil is used for the lead conductor 32 and the same material as that for the magnetic pole layer is used for the contact conductor 33, the formation can be performed simultaneously with the formation of the recording coil and the magnetic pole layer, and thereby, the number of manufacturing steps can be decreased.

A method for manufacturing a magnetic head structure according to an aspect of the present invention, in particular, a process for forming the recording-side monitor element 30W by using the main magnetic pole base layer 27, which is one of the features of the present invention, will be described below with reference to FIG. 4 to FIG. 6.

Figure 4:
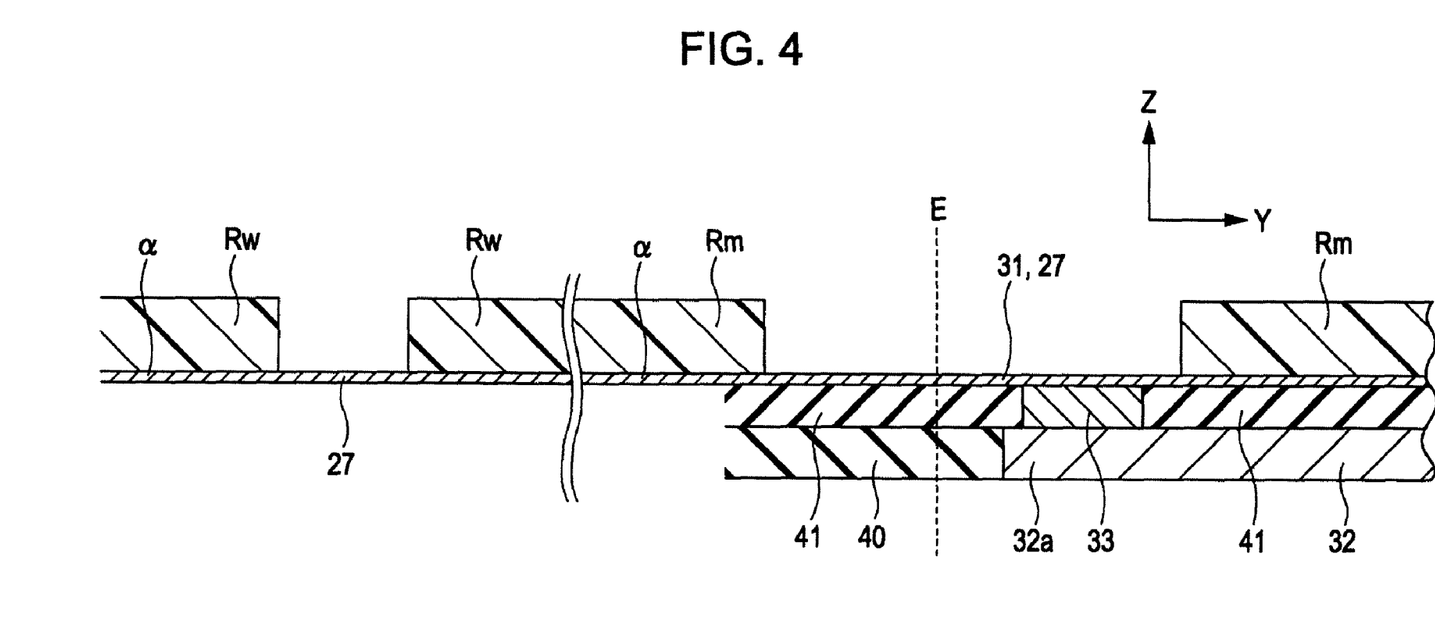
FIG. 4 is a sectional view showing one step in a method for manufacturing a thin film magnetic head substrate (in particular, a recording-side monitor element), to which the present invention has been applied.

As shown in FIG. 4, the lead conductor 32 is formed as a layer below a plane α for forming the main magnetic pole base layer 27, while being retreated to the back side in the height direction as compared with the polishing termination line E. An insulating material film 40 is formed around the lead conductor 32 from $Al_2O_3$, for example.

Subsequently, as shown in FIG. 4, the contact conductor 33 is formed on the medium-facing surface-side end portion 32a of the lead conductor 32. At this time, in order for all the conductor lower surfaces and the conductor upper surfaces of the contact conductors 33 to be covered with the lead conductor 32 and a resistance film that is formed in a downstream operation, the contact conductor 33 is formed in such a way as to have the dimension in the track width direction and the dimension in the height direction smaller than the dimensions in the track width direction and the dimensions in the height direction of the lead conductor 32 and the resistance film. Furthermore, the contact conductor 33 is formed in such a way as to have the thickness adequate for reaching the plane α for forming the main magnetic pole base layer 27. An insulating material film 41 is formed around the contact conductor 33 from $Al_2O_3$, for example. Consequently, the upper surfaces of the contact conductor 33 and the insulating material film 41 become flush with each other and are included in the plane α for forming the main magnetic pole base layer 27.

The above-described contact conductor 33 can be formed simultaneously with an auxiliary yoke layer disposed directly below the main magnetic pole base layer 27 in the head element portion 10. In the case where the auxiliary yoke layer and the contact conductor 33 are formed simultaneously, when the surface of the auxiliary yoke layer is flattened, the upper surface of the contact conductor 33 is flattened simultaneously, the flattened surfaces of the auxiliary yoke layer and the contact conductor 33 are flush with each other and included in the plane α for forming the main magnetic pole base layer 27.

As shown in FIG. 4, the resistance film 31 is formed on the plane α for forming the main magnetic pole base layer 27 including the upper surface of the contact conductor 33, simultaneously with the main magnetic pole base layer 27. The resistance film 31 is formed from the same material as that for the main magnetic pole base layer 27, and specifically, is formed to have a single-layer structure of any one of Ta, Cr, NiCr, Ti, CrTi, W, V, Ru, Rh, TiW, Au, Nb, CrMo, and NiFe or a multilayer structure in which at least two types thereof are laminated.

A main magnetic pole-forming resist pattern Rw is formed, and at the same time, as shown in FIG. 4, a monitor-forming resist pattern Rm astride the polishing termination line E in the height direction is formed so as to expose the resistance film 31. The shape of the monitor-forming resist pattern Rm is in accordance with the shape of the resistance film of the recording-side monitor element to be formed.

Figure 5:
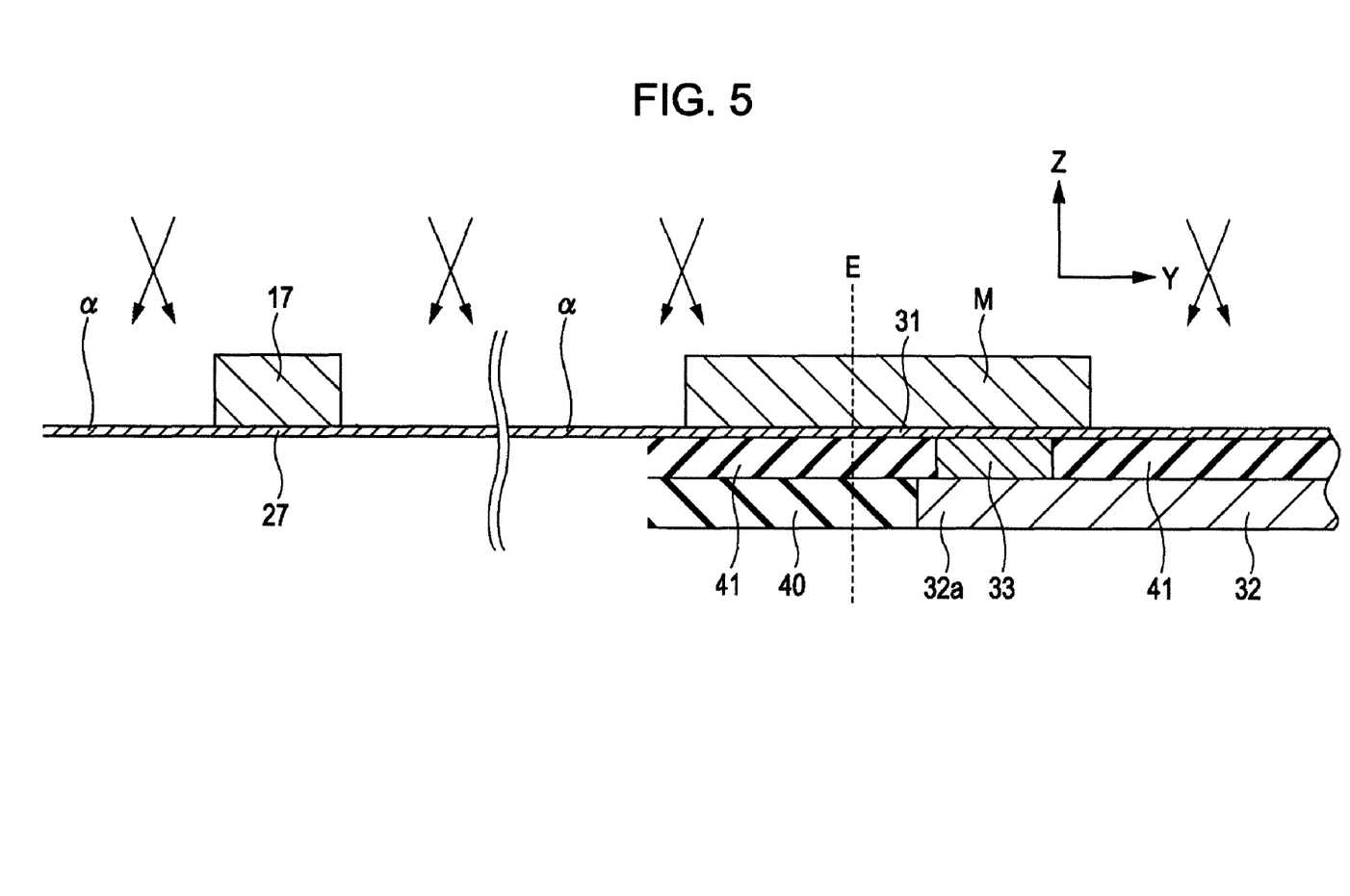
FIG. 5 is a sectional view showing a step following the step as shown in FIG. 4.

As shown in FIG. 5, the main magnetic pole layer 17 is formed on a region defined by the main magnetic pole-forming resist pattern Rw, and at the same time, a mask M is formed on the resistance film 31 exposed at the monitor-forming resist pattern Rm. In the present embodiment, the main magnetic pole layer 17 and the mask M are formed by plating. However, the main magnetic pole layer 17 and the mask M can also be formed by sputtering film formation. After the mask M is formed, the monitor-forming resist pattern Rm and the main magnetic pole-forming resist pattern Rw are removed simultaneously. In this manner, the main magnetic pole layer 17 is formed on the main magnetic pole base layer 27 in the head element portion 10.

As shown in FIG. 5, the main magnetic pole base layer 27 exposed at the main magnetic pole layer 17 is removed, and at the same time, the resistance film 31 exposed at the mask M is removed. Consequently, the resistance film 31 remains merely at the position directly below the mask M, that is, in a region for forming a recording-side monitor element. The removal of the main magnetic pole base layer 27 and the resistance film 31 are performed by milling, for example. The direction indicated by arrows as shown in FIG. 5 is the milling direction. The milling is terminated at the point in time when the surface α for forming the main magnetic pole base layer 27 and the upper surface of the insulating material film 41 are exposed.

The mask M on the resistance film 31 is removed, so as to expose the resistance film 31. The removal of the mask is performed by wet etching. In this wet etching step, the contact conductor 33 is not damaged by the etching because the entire surface of the contact conductor 33 is covered with the resistance film 31, and is not exposed to the outside. Therefore, the contact conductor 33 is formed as designed without a fear of occurrence of change in resistance nor break, and the resistance film 31 and the lead conductor 32 are conductively connected reliably. Likewise, since the lead conductor 32 is covered with the insulating material film 41, the lead conductor 32 is not damaged by the etching, so that there is no fear of occurrence of change in resistance nor break. The resistance film 31 is covered with an insulating material film formed from $Al_2O_3$, for example.

In this manner, the recording-side monitor element 30W, as shown in FIG. 3 and FIG. 6, is obtained.

The polishing for regulating the element height (neck height of Nh) of the recording element 16 by using the above-described recording-side monitor element 30W will be described below. In practice, the polishing is performed by using both the playback-side monitor element 30R and the recording-side monitor element 30W. In this step, element height dimensions of both the playback element 14 and the recording element 16 are regulated independently. However, merely recording-side polishing by using the recording-side monitor element 30W, which is the feature portion of the present invention, will be described here.

In this polishing, a wafer end surface is polished in a element height direction (back side in the height direction) of the recording element 16 while the element resistance is detected by passing a current through the recording-side monitor element 30W, and the polishing is terminated when the height direction dimension of the pole straight portion 17A of the main magnetic pole layer 17 reaches a predetermined neck height of Nh (a point in time when the polishing termination line E is reached). As the wafer end surface is polished, the height direction dimension of the pole straight portion 17A of the main magnetic pole layer 17 is decreased gradually, and at the same time, the element resistance of the recording-side monitor element 30W is changed in accordance with the height direction dimension of the pole straight portion 17A. In the recording-side monitor element 30W of the present embodiment, the contact conductor 33 and the lead conductor 32 are disposed while being retreated to the back side in the height direction as compared with the polishing termination line E. Therefore, merely the resistance film 31 is cut in this polishing, and the contact conductor 33 and the lead conductor 32 are not cut. Consequently, with respect to the recording-side monitor element 30W, the change in resistance due to cutting of the contact conductor 33 and the lead conductor 32 is zero. That is, the electric resistance of merely the resistance film 31 can be detected as the element resistance of the recording-side monitor element 30W during the polishing. Since the resistance film 31 is formed (patterned) by using the mask formed simultaneously with the main magnetic pole layer 17, as described above, the neck height of Nh of the main magnetic pole layer 17 can be regulated with high precision on the basis of the element resistance of this recording-side monitor element 30W.

In the above-described embodiment, the present invention is applied to the magnetic head structure provided with the main magnetic pole base layer 27 at the position directly below the main magnetic pole layer 17. However, in the case where a main magnetic pole layer 17 having a multilayer structure is included, the resistance film 31 of the recording-side monitor element 30W can be formed from the same material as that for the lowermost layer of the main magnetic pole layer 17 on the same plane but at a different position.

What is claimed is:

1. A magnetic head structure comprising a recording element comprising:
   a main magnetic pole layer; and
   a recording-side monitor element to be used as an element resistance monitor in polishing for forming a medium-facing surface of the recording element, the recording-side monitor element including:
      a resistance film, the resistance film being U-shaped in two-dimensions,
      a lead conductor located as a layer below the resistance film, the lead conductor comprising a first lead conductor part and a second lead conductor part separated from the first lead conductor part, and
      a contact conductor comprising a first contact conductor part and a second contact conductor part,
         the first contact conductor part connecting the resistance film and the first lead conductor part,
         the second contact conductor part connecting the resistance film and the second lead conductor part,
      wherein the resistance film is composed of the same material as that for a lowermost layer of the main magnetic pole layer or a base layer, the base layer being arranged beneath the main magnetic pole layer, and where the resistance film is disposed on the same plane as that for the lowermost layer or the base layer, in such a way as to straddle the surface position of a medium-facing surface to be regulated by the polishing in the height direction, and
   the contact conductor and the lead conductor are disposed while being retreated to the back side of the surface position of the medium-facing surface to be regulated by the polishing in the height direction,
   wherein the magnetic pole layer is formed on the base layer, and
   wherein the base layer is formed from the same material as the material for the resistance film.

2. The magnetic head structure according to claim 1, wherein the entire contact conductor is disposed on a medium-facing surface-side end portion of the lead conductor.

3. A method for manufacturing a magnetic head structure provided with a recording element having a main magnetic pole layer and a recording-side monitor element to be used as an element resistance monitor in polishing for forming a medium-facing surface of the recording element, the recording-side monitor element including a resistance film, a lead conductor located as a layer below the resistance film, and a contact conductor for conductively connecting the resistance film and the lead conductor, the method comprising:

forming a lead conductor as a layer below the plane on which a lowermost layer of the main magnetic pole layer or a base layer is formed, the base layer being arranged beneath the main magnetic pole layer, while the lead conductor is retreated to the back side of the surface position of the medium-facing surface to be regulated by the polishing in the height direction, the lead conductor having a first lead conductor part and a second lead conductor part separated from the first lead conductor part;

forming a contact conductor on a medium-facing surface-side end portion of the lead conductor in such a way that the lead conductor has an area to be entirely covered with a resistance film to be formed in a downstream operation and a thickness adequate for reaching the plane on which the lowermost layer of the main magnetic pole layer or the base layer is formed, the contact conductor having a first contact conductor part and a second contact conductor part;

forming a resistance film on the plane including the contact conductor from the same material as that for the lowermost layer of the main magnetic pole layer or the base layer simultaneously with the formation of the lowermost layer of the main magnetic pole layer or the base layer, the first contact conductor part connecting the resistance film and the first lead conductor part, the second contact conductor part connecting the resistance film and the second lead conductor part;

forming a mask covering the resistance film in such a way as to straddle the surface position of the medium-facing surface in the height direction simultaneously with the formation of the main magnetic pole layer, the resistance film being U-shaped in two-dimensions; and removing the resistance film exposed at the mask and, thereafter, removing the mask, wherein the main magnetic pole layer is formed on the base layer, and wherein the base layer is formed from the same material as the material for the resistance film.

4. The magnetic head structure according to claim 1, wherein each of the resistance film and the base layer comprise at least one of Ta, Cr, NiCr, Ti, CrTi, W, V, Ru, Rh, TiW, Au, Nb, CrMo, or NiFe.

5. The magnetic head structure according to claim 4, wherein each of the lead conductor and the contact conductor comprise at least one of Cu, Ni, or NiFe.

* * * * *